United States Patent
Yerkes et al.

(10) Patent No.: US 9,041,798 B1
(45) Date of Patent: May 26, 2015

(54) AUTOMATED POINTING AND CONTROL OF HIGH RESOLUTION CAMERAS USING VIDEO ANALYTICS

(75) Inventors: Michael A. Yerkes, Medford, NJ (US); Donna F. Smith, Hopewell, NJ (US); Louis Lagonik, Voorhees, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1819 days.

(21) Appl. No.: 12/168,428

(22) Filed: Jul. 7, 2008

(51) Int. Cl.
*H04N 7/18* (2006.01)
*G06K 9/36* (2006.01)
*H04Q 5/22* (2006.01)
*G06K 9/32* (2006.01)
*G01S 13/74* (2006.01)
*G06T 7/00* (2006.01)

(52) U.S. Cl.
CPC .............. *G06K 9/3241* (2013.01); *H04N 7/188* (2013.01); *G06T 7/0042* (2013.01); *G01S 13/74* (2013.01)

(58) Field of Classification Search
CPC ................ H04N 7/188; G06K 9/3241; G06K 2017/0045; G06T 7/0042; G01S 13/74
USPC .................................. 348/149, 152, 155, 169
See application file for complete search history.

(56) References Cited

U.S. PATENT DOCUMENTS

| | | | |
|---|---|---|---|
| 6,061,014 A | 5/2000 | Rautanen et al. | |
| 2003/0193562 A1* | 10/2003 | Corzillus | 348/148 |
| 2006/0203090 A1* | 9/2006 | Wang et al. | 348/143 |
| 2006/0227316 A1 | 10/2006 | Gatt | |
| 2007/0165967 A1* | 7/2007 | Ando et al. | 382/291 |
| 2009/0309704 A1* | 12/2009 | Chang et al. | 340/10.1 |
| 2010/0013917 A1* | 1/2010 | Hanna et al. | 348/143 |

* cited by examiner

*Primary Examiner* — Phuoc Nguyen
*Assistant Examiner* — Kishin G Belani
(74) *Attorney, Agent, or Firm* — Howard IP Law Group, PC

(57) ABSTRACT

An automated method for cueing a high resolution video camera to a mobile object involves first detecting the presence of an object by a wide-area surveillance asset such as a radar and using the radar's positional information to cue the video camera iteratively, while updating the positional information each time. Then, a video analytics algorithm detects the object and generates more accurate positional and rate information on the object, which is then used to cue the video camera into a higher resolution setting for classifying/identifying the object. Once the object is identified, the positional and rate information is updated and the updated information is used to further cue the video camera into a higher resolution setting for recording a video clip of the moving object while the video camera is dynamically steered.

10 Claims, 2 Drawing Sheets

AUTOMATED POINTING AND CONTROL OF HIGH RESOLUTION CAMERAS USING VIDEO ANALYTICS

CROSS-REFERENCE TO RELATED APPLICATION

None

FIELD OF THE INVENTION

This disclosure relates to automatic cueing of video cameras, visual and infrared, for wide area usage.

BACKGROUND

Modern military and border security operations rely increasingly on high resolution TV and forward looking infrared thermal imaging (FLIR) cameras to provide images of objects at a distance. The very narrow fields of view required to view distant objects make it impractical to use the cameras for wide area surveillance. Generally, the cameras must be cued by another sensor capable of providing wide area surveillance such as a radar or a network of ground sensors.

Radars and ground sensor networks for this type of application provide location accuracies comparable to the field of view of the cameras but update the estimated position of the object's position relatively infrequently. This delay between the position updates is long enough that the object can change direction, negating any accuracy improvement potentially achieved by considering a series of measurements, or predicting the future position of the object based on a determination of rate. Thus, one problem with current video surveillance systems is the inability to consistently cue the video camera based on the radar or ground sensor network's measurements so that the object of interest falls within the camera's field of view and remains there for the required observation time. Compounding the problem is the fact that it can take several seconds to steer the camera toward the object to bring the object within the camera's field of view and adjust the zoom and focus of the camera.

To increase the effectiveness of video surveillance, automated video processing algorithms have been introduced to reduce the number of false alerts caused by objects which are not of interest, and to alert an operator only when objects of possible interest are detected. These algorithms may use feature recognition, change detection, motion detection or a combination of these processes to evaluate an object. However, the video processing algorithms require that the camera remain fixed for 4-10 seconds or longer to learn the field of view background before the algorithms can be executed. Therefore, the automated video camera surveillance systems utilizing such video processing algorithms have substantial limitations when dealing with moving objects because the object can move out of the camera's field of view during the 4-10 second observation period. Thus, a second problem in current video surveillance systems is ensuring that a moving object remains within the field of view of the camera for a required time period.

In many cases, it is desirable to record a video clip of the object (once detected) for use at a later time. These video clips are typically 10-15 seconds in length. The challenge is to ensure a moving object remains within the camera's field of view during the video recording period.

SUMMARY

According to an embodiment of the present disclosure an automated method for cueing a video camera to an object within a surveillance area comprises detecting the presence of the object of interest by a wide-area surveillance asset and generating an estimate of the position of the object (i.e. bearing, elevation and range or latitude and longitude of the object as measured by the wide-area surveillance asset).

The video camera is then cued to the object's position as measured by the wide-area surveillance asset. In cueing the video camera, the video camera is set to a widest field of view consistent with detecting the object at the indicated range. Meanwhile, the wide-area surveillance asset re-detects the object and generates an updated position estimate of the object. Immediately after the object is re-detected by the wide-area surveillance asset, the video camera is re-cued to the new position estimate of the object. Immediately, in this context of re-cueing of the camera means that the re-cueing of the camera, including steering, setting zoom, etc. be completed within two seconds (i.e. two seconds or less) of the measurement by the wide-area surveillance asset. Again, the video camera is cued to have widest field of view consistent with detecting the object at the updated position.

While holding the video camera settings constant for a predefined duration, a video analytics algorithm is used to automatically detect the object from the video image frames from the video camera and obtain an improved estimate of the object's position. Then, using the improved estimate of position of the object and rate information obtained from the video analytics algorithm, the video camera is again re-cued to a position based on the predicted position of the object biased in the direction of the object's motion. This allows a further decrease in field-of-view (and increase in the target object's resolution) of the video camera. In this next step, a narrower field of view consistent with classifying the object is selected.

Next, the object is automatically classified using the video analytics algorithm while the video camera settings are held constant for a predefined duration. The predefined duration is sufficiently long to permit the video analytics algorithm to classify the object, and to determine updated rate information on the object.

If the object is determined to be of interest and a video clip is desired, the camera is re-cued and dynamically steered based on the position and rate information determined by the video processing algorithm, and a video clip of the object is recorded for a predetermined duration.

The method of the present disclosure allows controlling the pointing and zooming of high resolution cameras in a manner which keeps the object of interest in the field of view of the camera, provides control of the camera to provide successively higher resolution of the target object for classification, and the ability to record a high resolution video clip of a moving object.

BRIEF DESCRIPTION OF THE DRAWINGS

These and other features and advantages of the present invention will be more fully disclosed in the following detailed description of a preferred embodiment of the invention, which is to be considered together with the accompanying drawings wherein like numbers refer to like parts, and further wherein.

DETAILED DESCRIPTION

Figure 1:
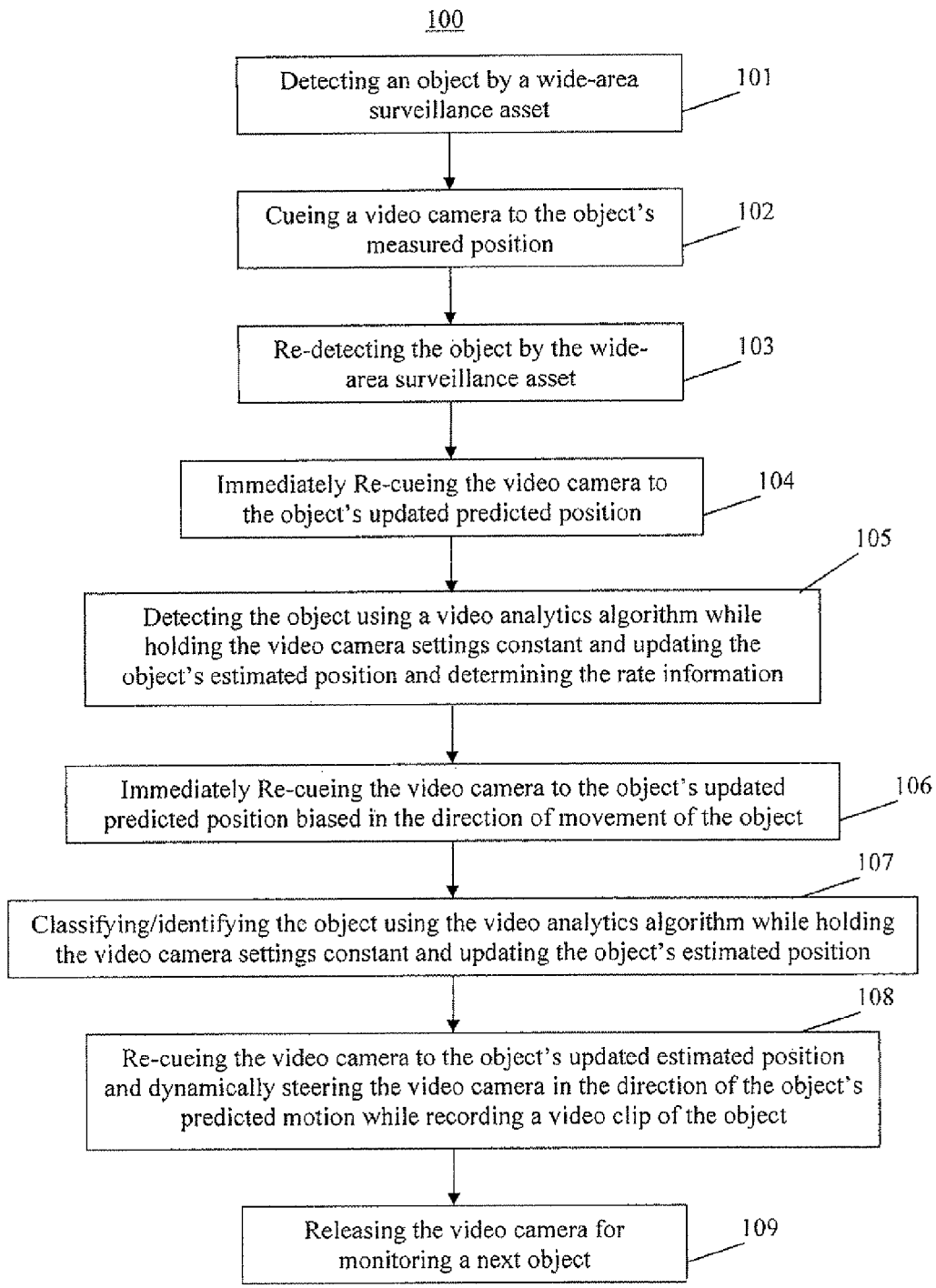
FIG. 1 is a flowchart illustrating the method according to one embodiment of the present disclosure.

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. The terms "cueing" and "cue" are used herein to refer to the act of pointing a video camera in the direction of a target object including the acts of setting the zoom and focus of the video camera appropriately to view the target object. For example, the pan-tilt-zoom functions of a PTZ camera are examples of possible cueing actions.

Figure 2:
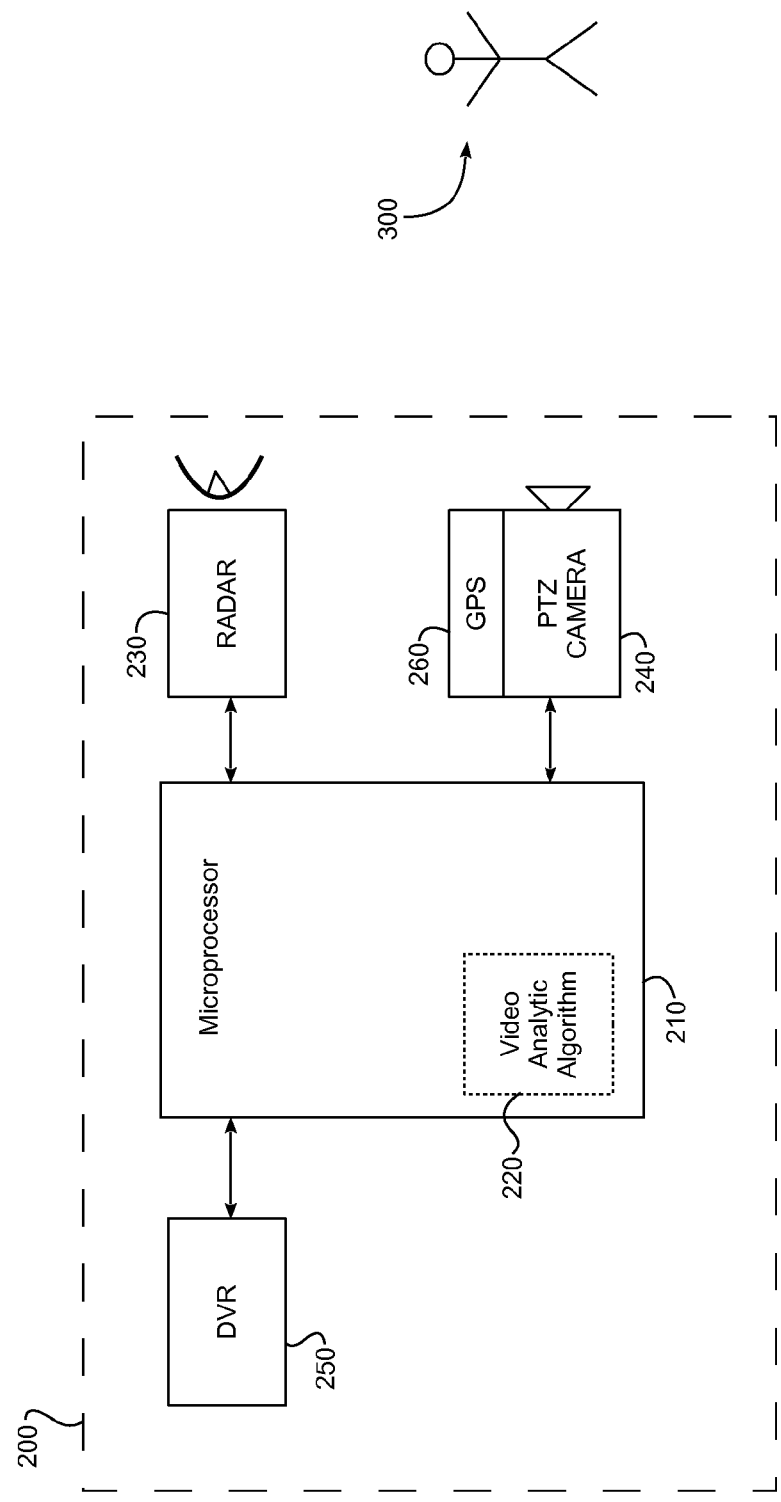
FIG. 2 is a schematic diagram of a high resolution video surveillance system according to one embodiment of the present disclosure.

Referring to FIGS. 1 and 2, a preferred embodiment of the present disclosure will be described. High resolution video cameras are not well suited for surveillance of distant objects in wide areas due to the large number of positions which must be examined and the length of time required to provide coverage of a large area using the high resolution video camera's narrow field of view. For this reason, according to an embodiment of the present disclosure, an automated system 200 and method for cueing a video camera 240 to a target object 300 utilizes a wide-area surveillance asset 230 to make the initial detection of an object that may potentially be of interest. Examples of such wide-area surveillance asset are a series of unattended ground sensors or a radar system. Such wide-area surveillance assets are more suited to area surveillance. The example of the wide-area surveillance asset 230 shown in FIG. 2 is a radar system. The target object 300 is on the ground within the surveillance area and must be a mobile object. The system and method of the present disclosure is particularly beneficial for detecting, classifying and video recording a mobile target.

The wide-area surveillance asset 230 detects and measures the positional information on the object 300. The positional information includes the range (i.e. the distance from the surveillance asset to the object) and bearing (the position of the object defined by the azimuth angle defined in the sensor's reference frame). The object can change direction during period between observations, so angular velocity of the object is not necessary here. Alternatively, a wide area surveillance system may report an estimate of the latitude and longitude as the object's positional information.

The video camera 240 is cued to the positional information measured by the wide-area surveillance asset 230. This may take several seconds. The cueing of the video camera includes slewing the video camera 240 via its PTZ controller to point the video camera in the direction of the target object 300 and focusing on the object according to positional information. The cueing of the video camera also includes setting the zoom to select the largest field of view consistent with detecting the object. This is considered pre-positioning of the camera for the next step.

In one preferred embodiment, the wide-area surveillance asset 230 and the video camera 240 are co-located so that the positional information from the wide-area surveillance asset 230 does not have to be translated for the positional difference between the wide-area surveillance asset and the video camera. If they are not co-located, however, one skilled in the art can readily translate the positional information from the wide-area surveillance asset to the reference frame of the video camera using the processor 210. Geospatial coordinates of the camera can be obtained via a GPS unit 260. This positional information of the camera is used to calculate the required pan and tilt parameters for cueing the camera to an objects location (measured in various ways that include the target's translated bearing and range or latitude and longitude).

The wide-area surveillance asset 230 is programmed to repeatedly survey the surveillance area.

Thus, after the initial cueing of the video camera 240, the wide-area surveillance asset 230 redetects the object and generates updated positional information on the object. Then, the video camera 240 is immediately re-cued to the object 300 using the updated range and bearing information. The field of view is now set to the widest field of view consistent with detecting the object at the determined range considering the maximum anticipated rate of the object and the shorter time needed to re-cue the camera which has already been cued to the vicinity of the object. This reiteration of the cueing of the video camera based on the updated positional information from the wide-area surveillance asset 230 assures that the video camera will be cued properly to capture the detected object 300. This is because the time delay in pointing and adjusting the camera has been reduced by the initial cue. For example, depending on which direction the video camera was pointing before the current object was detected, the initial cueing time delay, the time between the detection of the object by the wide-area surveillance asset and the completion of the cueing of the video camera to the object, might be too long to initially capture the object within the field of view of the video camera because the object, if mobile, could have moved out of the set field of view. By reiterating the cueing of the video camera immediately following a redetection by the wide area surveillance asset, the time delay is substantially reduced and the likelihood of the object remaining in the camera's field of view is maximized.

[Detection by Video]

After the video camera 240 is re-cued and the video camera settings reset to the most recent object information from the wide-area surveillance asset 230, the video camera settings are held constant for a predefined duration (observation time) sufficiently long to permit a video analytics algorithm 220 to automatically detect the object 300 from the digitized video frames from the video camera. The video analytics algorithm 220 will determine and output highly accurate updated information on the object's position and will provide accurate rate information on the object. The system's processor 210 will calculate and update the predicted position of the object.

The video analytics algorithm 220 automatically detects the moving object 300. Some video analytics algorithms detect a moving object by detecting the pixel changes against the static background in a camera's field of view as the object moves through it. Video analytics algorithms can be provided as software or firmware. Many video analytics algorithms currently available require that the video camera remain fixed during the data collection period to maintain a static background and that the moving object must not exit the camera's field of view during the data collection period, typically 4-10 seconds. Thus, during the re-cueing of the vide camera discussed above, the video camera's field of view was set to the widest field of view consistent with detecting the object at its particular range so that the moving object will remain in the field of view for 4-10 seconds. The field of view setting also is set to so that the detected object (assumed to be the smallest object of interest, e.g. a human) will occupy at least the minimum amount of pixels in the digitized video image frame required by a Video Analytics Algorithm 220 for detection at the estimated object's range from the camera.

In order to accurately determine the appropriate field of view for detecting the object 300 by the video analytics algorithm 220, the uncertainty in predicting the position of the moving object must also take into consideration the bearing accuracy of the wide-area surveillance asset. If the bearing accuracy as measured at the video camera by the wide area surveillance asset is X radians, the total bearing uncertainty that must be considered is given by:

$$W=2 \arcsin(X/2+VT/R) \quad (1)$$

where, V is the object's transverse velocity in meters/sec, T is the time between the last measurement by the wide-area surveillance asset and the end of the required observation period in seconds (includes the time to re-steer and adjust the camera and observe the object for the period of time to make a reliable detection by the video analytics algorithm), and R is the range to the object in meters. To be reasonably certain that the object will remain within the field of view of the video camera, the horizontal field of view of the video camera must be greater than W. In practice, the widest field of view consistent with detection of the object at the specified range should be used in order to maximize the transverse velocity which can be tolerated, and the observation time.

To minimize the latency T, assume the video camera has been pre-positioned based on previous radar measurement so the camera may be stewed to the next radar measurement within a very short time. Video analytics algorithms typically can detect an object in 4-10 seconds, so T will typically range between 5 and 12 seconds.

[Classification]

Next, using the updated object's measured position and rate information determined from the detection step performed using the video analytics algorithm 220, the video camera 240 is immediately re-cued with updated video camera settings in preparation for classifying or identifying the object 300 using the video analytics algorithm 220. In doing so, similar consideration in cueing of the video camera for detection of the mobile object are brought to bear in determining the video camera cueing necessary to provide higher resolution of the object for classification and recording of video clips once video camera data are available to determine more accurate estimation of the object position and rates.

In re-cueing the video camera 240 in preparation for classifying the object 300, the field of view is also biased in the direction of the object's motion, if the object is mobile. In other words, the video camera is aimed so that the camera's field of view is leading the object 300 in the direction of the object's motion to allow the zoom to be maximized consistent with the time the object is expected to remain within the video camera's field of view. The field of view is selected to provide the higher resolution required for classification/identification following detection. This would be a narrower field of view and would result in the object occupying a larger part of the field of view, thus more video image pixels, when compared with object detection. The object being classified must occupy at least the minimum amount of pixels in the digitized video image frame required by a Video Analytics Algorithm 220 for classification at the estimated object's range from the camera.

Again, the video camera settings are held constant and the video camera 240 must remain stationary for duration sufficient to permit the video analytics algorithm 220 to automatically classify the object and also update the object's positional and rate information. The video analytics algorithm 220 is configured to automatically classify an object as being of interest or not of interest and perhaps provide discrimination among various object classes (e.g. human, animal, car, truck, wind-blown debris, etc.

In one preferred embodiment, the field of view is biased so that 25% of the field of view is behind the moving object and the remaining field of view is ahead of the object. For a maximum expected transverse velocity of V meters per second, a range R to the object, and a time T1, in seconds (sum of the time to re-steer and adjust the camera based on the rate information developed during the detection phase, and observe the object for the time necessary for classification/identification), the horizontal field of view, Hfov, for the camera must satisfy the following inequality to provide reasonable certainty that the object will not exit the camera coverage before classification/identification are complete:

$$Hfov > 2 \arcsin(0.75VT1/R) \quad (2)$$

Consistent with this inequality, selection of Hfov should be as wide as possible yet still provide the target object resolution necessary for reliable classification.

[Recording a Video Clip of the Object]

In one preferred embodiment, once the video analytics algorithm 220 classifies the object 300 and determines that the object is possibly of interest, the video camera 240 is again immediately adjusted and re-cued to reflect the most recent updated position and rate of the object as derived from the video analytics algorithms. If a video clip of the moving object of interest is desired, the system setting can be configured to start video recording immediately after the classification of the object as being an object of interest to maximize the probability that the object will remain in the field of view. During the video recording, the video camera 240 is dynamically steered to follow the moving object based on the estimated angular velocity of the object determined by the system's processor 210 based on the object's positional and rate information generated by the video analytics algorithm 220 during the classification step. The video frames from the video camera 240 are generally recorded for a short duration into a video clip. The system 200 can be provided with a video recording device such as a Digital Video Recorder 250 or other suitable data storage device compatible with storing and retrieving a digital video stream. Note that video analysis is not required during this recording period while the video camera is dynamically steered. At the end of the desired recording interval, the camera can be released to investigate the next object detected by the radar. (see box 109 of FIG. 1).

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An automated method for cueing a video camera to an object at an indicated range comprising:
 (a) detecting the object by a wide-area surveillance asset and generating an estimate of position of the object;
 (b) cueing the video camera to the object's estimated position by setting the video camera to a widest field of view consistent with detecting the object at the indicated range;
 (c) re-detecting the object by the wide-area surveillance asset and generating an updated estimate of position of the object;
 (d) re-cueing the video camera to the object's updated estimated position by setting the video camera to the widest field of view consistent with detecting the object at the indicated range;
 (e) detecting the object and generating an updated position and velocity estimate of the object using the video camera and a video analytics algorithm while holding video camera settings constant;

(f) re-cueing the video camera to the object's updated position from step (e) selecting a narrower field of view consistent with classifying the object including aiming the video camera based on the velocity estimate obtained from step (e) such that the field of view of the video camera is biased in the direction of motion of the object; and (g) classifying the object and generating an updated position and velocity estimate of the object using the video camera and the video analytics algorithm while holding the video camera settings constant.

2. The method of claim 1, further comprising re-cueing the video camera and dynamically steering the video camera based on the updated position and velocity information obtained in step (g) while recording a video clip of the object for a predetermined duration.

3. The method of claim 1, wherein detecting the object by the wide-area surveillance asset in step (a) includes measuring the object's positional parameters.

4. The method of claim 1, wherein re-detecting the object by the wide-area surveillance asset in step (c) includes measuring the object's positional parameters and results in a re-cue of the video camera.

5. The method of claim 1, wherein detecting the object using the video analytics algorithm in step (e) includes measuring the object's positional and velocity parameters.

6. The method of claim 1, wherein classifying the object using the video analytics algorithm in step (g) includes measuring the object's positional and velocity parameters.

7. The method of claim 1, wherein the cueing in step (b) comprises:
   aiming the video camera towards the object;
   focusing the video camera to the object; and
   selecting the field of view to provide the widest field of view consistent with detecting the object by the video analytics algorithm.

8. The method of claim 1, wherein the re-cueing of step (d) comprises:
   re-cueing the video camera following re-detection by the wide area surveillance asset;
   aiming the video camera towards the object;
   selecting the field of view to provide widest field of view consistent with detecting the object by a video analytics algorithm; and
   focusing the video camera to the object, wherein an aim, a focus and a field of view of the video camera defines settings for the video camera.

9. The method of claim 1, wherein an aim and a field of view of the video camera are selected such that the object will remain in the field of view of the video camera for a predetermined period of time of about 4 to 10 seconds.

10. The method of claim 1, wherein the re-cueing of step (f) comprises re-cueing the video camera such that the object will remain in the field of view of the video camera for a predetermined period of time of about 4 to 10 seconds.

\* \* \* \* \*